Patented Feb. 7, 1939

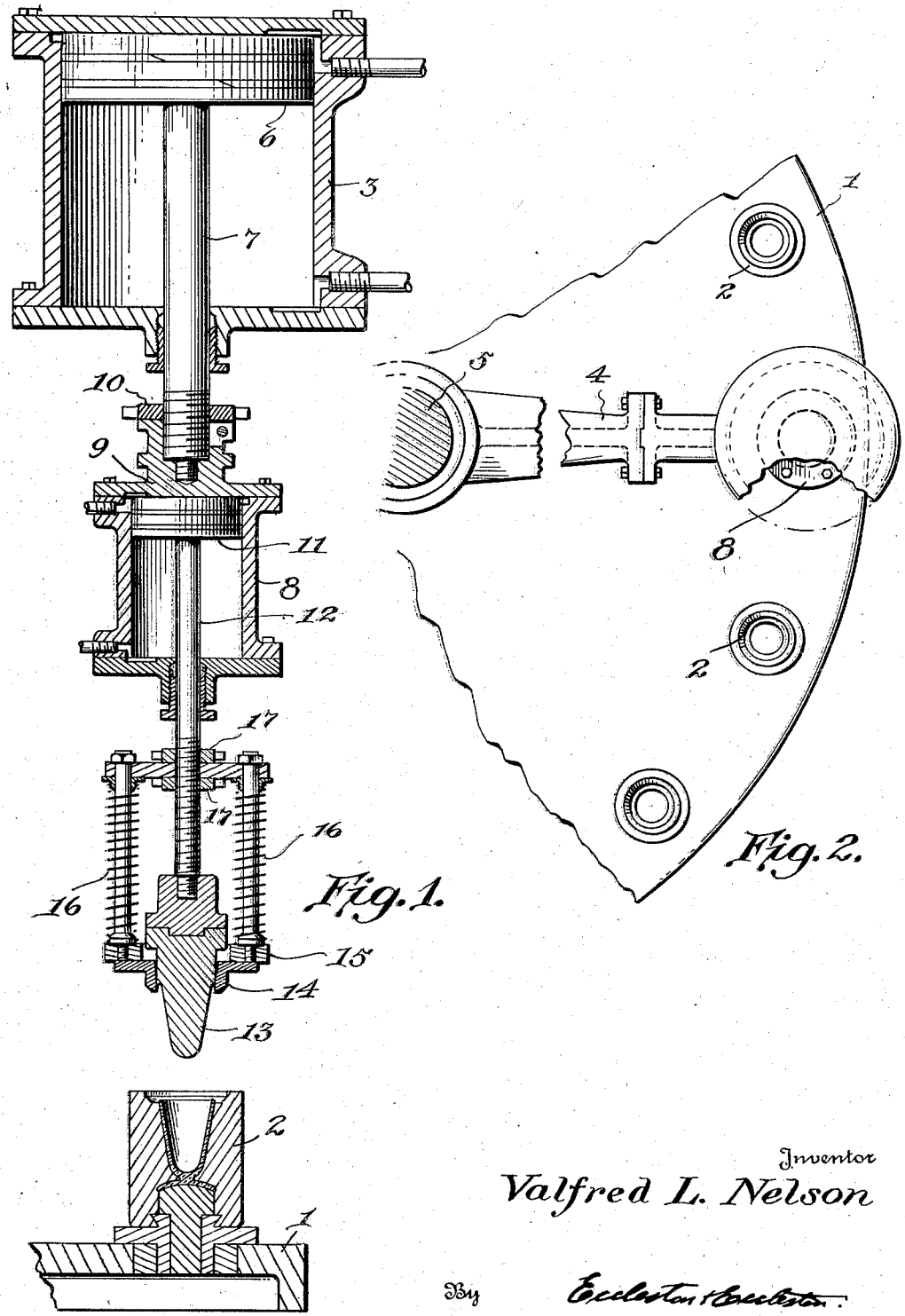

2,146,346

UNITED STATES PATENT OFFICE 2,146,346

GLASS PRESS

Valfred L. Nelson, Clarksburg, W. Va., assignor to Hazel-Atlas Glass Company, Wheeling, W. Va., a corporation of West Virginia Application February 17, 1936, Serial No. 64,369

4 Claims. (Cl. 49—38)

The invention relates particularly to glass machines for pressing glass tumblers and other glass articles. In accordance with the usual practice a mold table, carrying a plurality of glass molds, is rotated step by step to bring the molds successively to a plurality of stations.

At one of these stations a charge of molten glass is fed to a mold, and at another station the molten charge is pressed into the desired form, etc.

The pressing of the glass into the desired shape, at the pressing station, is accomplished by a pressing or shaping plunger which is forced into the molten glass by a compressed air cylinder. If large glass articles are being manufactured a large cylinder is necessary for operating the shaping plunger, and this large cylinder can be employed for operating the shaping plunger for small glass articles, but it will be apparent that there will be a great economy in operation if a small cylinder could be employed for operating the plunger when small glass articles are being manufactured.

Further, the same forming machine is used for manufacturing large and small articles, it being only necessary to shift the molds and plungers for different articles; and one of the main objects of the present invention is to provide means by which a small cylinder can be installed and removed just as easily as the various sizes of molds and plungers are installed and removed. By means of this improved construction the efficiency of operation is greatly increased, as will be apparent.

The invention will be clearly understood from the following detailed description, when taken in connection with the accompanying drawing, in which, Figure 1 is a vertical sectional view of the preferred apparatus; and Figure 2 is a plan view thereof.

Referring to the drawing in more detail, numeral 1 indicates the table of a glass pressing machine, upon which is mounted the desired number of molds 2. In accordance with the usual practice this table is rotated step by step to bring the molds successively to the pressing station.

Numeral 3 refers to the usual pressing cylinder, mounted on a bracket 4 carried by the machine column 5. This cylinder is provided with the usual piston 6 and piston rod 7. In accordance with the conventional practice a pressing plunger of the desired size and shape is removably attached to the piston rod 7, and this cylinder is large enough to take care of the pressing of the largest size articles to be made by the forming machine. And, of course, it can also be employed in the pressing of small articles. It is apparent, however, that there is a great loss of efficiency if this large cylinder is employed in the pressing of small articles. Of course two cylinders, of different sizes, could be permanently connected with a single piston rod carrying the pressing plunger, but that is not particularly economical and efficient, first, because it requires the installation of two pressing cylinders for each machine, and second, because when only one of the cylinders is being used for the pressing operation that cylinder must also operate the piston of the cylinder which is not being used. In accordance with the present improvement, the preferred embodiment of which will now be described, one of the cylinders can be temporarily attached to any machine where it is desired, just as different molds and different pressing plungers are employed; and when this cylinder is being operated there is no movement of the piston of the large permanent cylinder.

As stated above when the large cylinder 6 is being used the shaping plunger is removably attached to the piston rod 7. In accordance with the present invention when the articles being pressed do not require the large cylinder, the pressing plunger is removed and a small cylinder 8 is removably attached to the end of the piston rod 7. In the specific form illustrated the cylinder head 9 is threaded so that it can be screwed onto the piston rod, and is locked in position by a nut 10.

The small cylinder 8 is provided with a piston 11 and piston rod 12. This piston rod carries the conventional parts, including the shaping plunger 13, neck ring 14, spring plate 15, springs 16, and nuts 17 threaded on the piston rod to adjust the tension on the springs. Of course plungers of various shapes and sizes can be substituted as desired.

Let it be assumed that the press has been used for the manufacture of large articles, using the large cylinder 3, and that the machine is now to be used for manufacturing small articles. It is necessary, of course, to substitute different molds for those formerly employed, and it is also necessary to substitute a different shaping plunger. While doing this it is only necessary, in accordance with the present invention, to mount on the piston rod 7, in place of the removed shaping plunger, a small cylinder 8. Of course the piston rod 7 must be maintained stationary, and that is preferably accomplished by maintaining air pressure beneath the piston 6, although it could obviously be accomplished by mechanical means, such as by extending the piston rod 7 through the upper end of the cylinder and locking it in position when the small cylinder is to be attached.

By thus temporarily attaching a small cylinder to the machine, when small molds are to be used, there is provided a completely efficient machine for the pressing of both large and small articles. By this simple construction the efficiency of operation is not only greatly improved, but also the cost is at a minimum, for the small cylinders can be transferred from one machine to another, as the lines of ware being manufactured may require.

While I have described the preferred embodiment of the invention, yet it will be apparent that numerous changes and modifications may be made, and all such changes and modifications are intended to be included within the scope of the appended claims.

What I claim is:

1. In a glass pressing machine, a mold table, molds carried by the table, a fluid pressure cylinder and piston positioned above the table, a piston rod connected with and extending downwardly from the piston and adapted to reciprocate a pressing plunger, a fluid pressure cylinder differing in size from the first cylinder and mounted on the lower end of the piston rod of the first cylinder, a piston and a downwardly extending piston rod associated with the second cylinder, and a pressing plunger mounted on the lower end of the second piston rod and reciprocated thereby, for pressing glass in said molds.

2. In a glass pressing machine, a mold table, molds carried by the table, a fluid pressure cylinder and piston positioned above the table, a piston rod connected with and extending downwardly from the piston and adapted to reciprocate a pressing plunger, a fluid pressure cylinder differing in size from the first cylinder and removably mounted on the lower end of the piston rod of the first cylinder, a piston and a downwardly extending piston rod associated with the second cylinder, and a pressing plunger mounted on the lower end of the second piston rod and reciprocated thereby, for pressing glass in said molds.

3. In a glass pressing machine, a mold table, molds carried by the table, a fluid pressure cylinder and piston positioned above the table, a piston rod connected with and extending downwardly from the piston and adapted to reciprocate a pressing plunger, a relatively small fluid pressure cylinder removably mounted on the lower end of the piston rod of the first cylinder, a piston and a downwardly extending piston rod associated with the second cylinder, a pressing plunger mounted on the lower end of the second piston rod and reciprocated thereby, for pressing glass in the molds, and means for maintaining the piston rod of the first cylinder against movement while the second cylinder is in use.

4. In a glass pressing machine, a mold table, molds carried by the table, a fluid pressure cylinder and piston positioned above the table, a piston rod connected with and extending downwardly from the piston and adapted to reciprocate a pressing plunger, a smaller fluid pressure cylinder, a piston and a downwardly extending piston rod associated with the smaller cylinder, a pressing plunger mounted on the lower end of the second piston rod for pressing glass in said molds, means for removably mounting the second cylinder in operative position on the lower end of the piston rod of the first cylinder when smaller ware is to be pressed, and means for preventing movement of the piston rod of the first cylinder when the second cylinder is in use.

VALFRED L. NELSON.